No. 776,289. PATENTED NOV. 29, 1904.
H. M. BARBER.
MECHANICAL MOVEMENT.
APPLICATION FILED SEPT. 22, 1903.
NO MODEL.
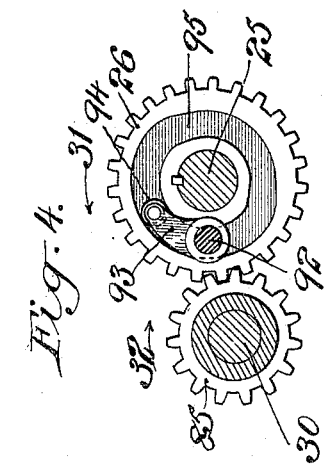
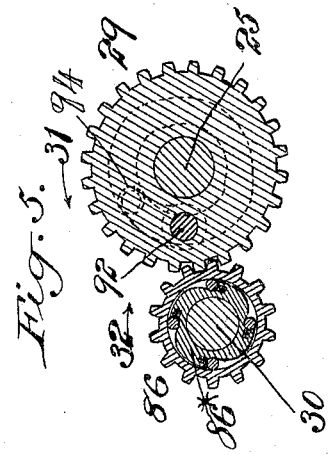
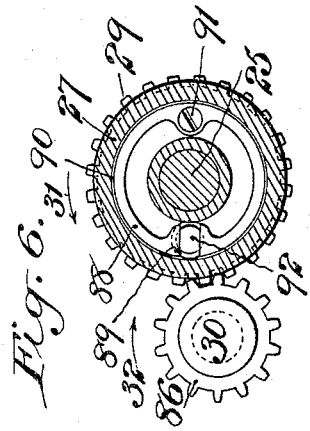
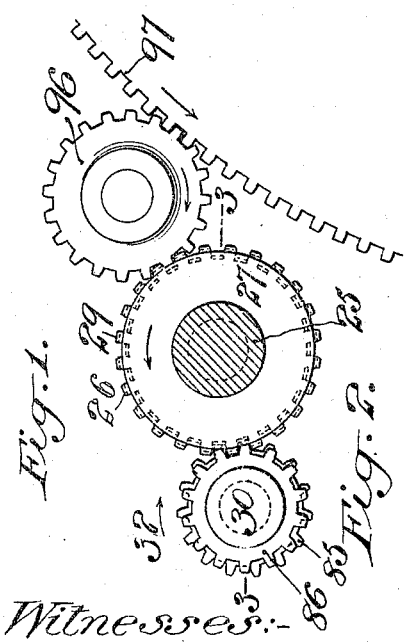
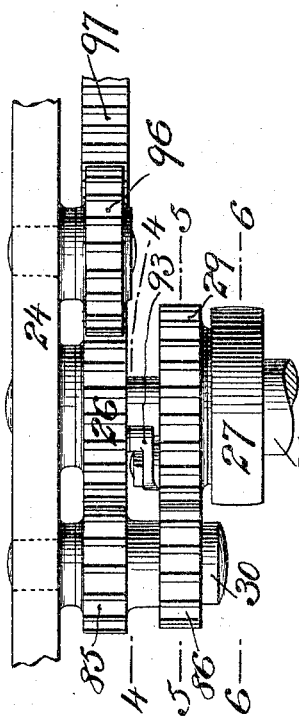
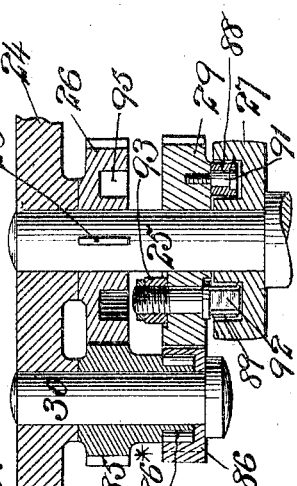

No. 776,289. Patented November 29, 1904.

UNITED STATES PATENT OFFICE.

HOWARD M. BARBER, OF STONINGTON, CONNECTICUT, ASSIGNOR TO C. B. COTTRELL & SONS COMPANY, OF NEW YORK, N. Y., A CORPORATION OF NEW JERSEY.

MECHANICAL MOVEMENT.

SPECIFICATION forming part of Letters Patent No. 776,289, dated November 29, 1904.

Application filed September 22, 1903. Serial No. 174,167. (No model.)

*To all whom it may concern:*

Be it known that I, HOWARD M. BARBER, a citizen of the United States, and a resident of Stonington, in the county of New London and State of Connecticut, have invented a new and useful Mechanical Movement, of which the following is a specification.

The object of this invention is the transmission from a constantly-rotating mechanical member of an intermittent rotary motion to another member; and to this end the invention consists in the devices represented in the accompanying drawings and hereinafter described and claimed.

Figure 1 of the drawings is a side view of the movement; Fig. 2, a plan of the same; Fig. 3, a horizontal section of the same on the line 3 3 of Fig. 1; Figs. 4, 5, and 6, vertical sections taken, respectively, in the lines 4, 5, and 6 of Fig. 2.

Similar reference-numerals refer to corresponding parts in the several figures.

24 designates one side of any suitable framing for the support of a rotary shaft 25, which carries the two principal members 26 27 of the movement, the member 26, which is the constantly-rotating or primary member, being in this example a spur-gear fastened on said shaft by a key 28, and the member 27, which may be termed the "secondary" member, to which the intermittent rotary motion is to be given, being a pulley fitted loosely on said shaft. The said shaft also has loose upon it a spur-gear 29, which may be termed the "intermediate" gear, which has the same number of teeth as 26. The spur-gear 26 meshes with one, 85, of two gears 85 86, having a common axis. These gears 85 86, having different numbers of teeth, may be termed the "differential" gears and are represented as fitted to turn loosely on a fixed stud 30, secured in the framing 24. These differential gears are represented in Figs. 3 and 5 connected by a ball-clutch 86* of ordinary construction, so that when the gears 26 and 85 rotate, respectively, in the direction of the arrows 31 32, (shown near them in Figs. 4 and 5,) the gear 85 being the driver of 86, said gears 85 86 are virtually fixedly connected by the clutch, so that both revolve together as though they were both fast on or integral with one hub, the only object of the clutch being to permit the reversal of the rotation of the primary member or gear 26 without transmitting any movement to the secondary member or pulley 27.

The loose intermediate gear 29 carries on its outer face a clutch 88 (see Figs. 3 and 6) in the form of an elastic ring which has an opening 89 at one point in its periphery and which is received in an annular groove 90 in the inner face of the secondary member or pulley 27. This clutch-ring, which is attached to the loose intermediate gear 29 by a screw 91, has normally an external diameter slightly smaller than the outer wall of the groove 90, as shown in Fig. 6, that it may normally be sufficiently loose in said groove to make it inoperative; but for the purpose of expanding it to make it couple the pulley 27 to the gear 29 there is inserted through the said gear a pin 92, which has a flattened head forming a cam which enters, as shown in Fig. 6, into the opening 89 of the clutch-ring. By the turning of this pin-cam 92 on its axis its head, operating within the opening 89, so expands the ring that it fits tightly enough in the groove 90 of the pulley for the gear 29 to drive the latter at the times required. For the purpose of so turning the pin-cam 92 it has securely affixed to it an arm 93, which carries a truck-roller 94, which enters a cam 95, (see Figs. 3 and 4,) constituted by a groove in the outer face of the gear 26, the said cam being so formed that by its action on the roller 94 and arm 93 of the pin-cam 92 it will during one part of each revolution of said gear spread the clutch-ring and couple the pulley 27 with the gear 29 for driving the pulley and will during the remainder of each revolution leave the clutch-ring unexpanded and leave the pulley free from the gear, thereby intermitting the driving of the latter, the intermissions and repetitions of the movements of the latter depending upon the relative numbers of teeth in the differential gears 85 86 and upon the form of the cam 95, as may be understood by the description which I will now give of the operation of the example of the movement which I have selected for illustration. In this example the gear 85 has fifteen teeth and gear 86 has fourteen, and the form of the cam 95 is such that one half of its circumference will, by reason of the different velocities of the primary gear 26 and the loose gear 29 consequent upon the different numbers of teeth in the differential gears, produce the engagement of the clutch 88 and the other half produce its disengagement.

The operation is as follows: Continuous rotary motion being given in the direction of the arrow 31 to the gear or primary member 26 and its shaft 25, the said gear drives the differential gear 85 in the direction of the arrow 32, and the other differential gear 86 drives the loose gear 29 in the same direction as 26, but at a slower speed, the said gear 29 being retarded one tooth relatively to the primary gear 26 during every revolution of the differential gears by reason of gear 86* having one tooth less than 85. The loose gear 29 is thus caused to make fourteen revolutions for every fifteen of the primary gear or member 26. Therefore as the cam 95, operating on the arm 93 of the pin-cam 92, places the clutch 88 in and out of operation to drive and liberate the pulley 27 or secondary member of the movement during alternate cycles of seven and a half revolutions of said primary member the latter member by its continuous rotation produces repeated cycles of seven rotations of the secondary member with corresponding intermissions.

This movement may be employed not only to produce from the continuous rotation of a primary member any desired number of repeated revolutions of a driven or secondary member with intermissions in the revolutions of the latter, but it may be employed to produce several intermitted series of revolutions of the secondary member during one revolution of any rotating member. This is illustrated in Fig. 1, in which the so-called "primary" member or gear 26 is driven through an idler-gear 96 from a gear 97, which has seven times the number of the teeth of said gear 26. The primary member thus driven will produce seven revolutions of the secondary member 27 and seven corresponding intermissions of its revolution during every revolution of the gear 97.

It will be understood that, although with the clutch 86* (illustrated in Figs. 3 and 5) the movement is only operative with the rotation of its gears or members, respectively, in one direction, if the differential gears 85 86 were fixedly or permanently connected the movement will be operative in either direction.

What I claim as my invention is—

1. The combination of primary and secondary rotary members and a shaft upon which one of said members is fixed and the other loose, a loose gear capable of turning on said shaft independently of both of said members, differential gears adapted to turn together about a common axis, one of said gears deriving motion from the primary rotary member and the other meshing with said loose gear, a clutch between said loose gear and the secondary rotary member, and a cam arranged to rotate with said shaft for effecting the intermittent engagement and disengagement of said clutch and thereby producing from the continuous rotary motion of the primary member an intermittent rotary motion of the secondary member.

2. The combination of primary and secondary rotary members and a shaft upon which one of said members is fixed and the other loose, a loose gear capable of turning on said shaft independently of both of said members, differential gears having a common axis, a clutch between said differential gears by which they are coupled in one direction but left disengaged in the opposite direction, one of said gears deriving motion from the primary rotary member and the other meshing with said loose gear, a second clutch between said loose gear and the secondary rotary member, and a cam arranged to rotate with said shaft for effecting the intermittent engagement and disengagement of said second clutch.

3. The combination of primary and secondary rotary members and a shaft upon which one of said members is fixed and the other loose, a loose gear capable of turning on said shaft independently of both of said members, differential gears adapted to turn together about a common axis, one of said gears deriving motion from the primary rotary member and the other meshing with said loose gear, a clutch consisting of an expanding-ring attached to said secondary member for engagement with said loose gear, a cam pivoted in said loose gear for expanding said ring, and a second cam on said primary member for producing the operation of the first-mentioned cam for the expansion of said ring.

4. The combination with primary and secondary rotary members and a rotary shaft on which said primary member is fast and the secondary member is loose, a loose gear located on said shaft between said primary and secondary members, differential gears having a common axis and one meshing with said primary member and the other with said loose gear, a clutch between said loose gear and the secondary rotary member and a cam on said primary member for effecting the intermittent engagement of said clutch.

In testimony that I claim the foregoing as my invention I have signed my name, in presence of two witnesses, this 29th day of August, A. D. 1903.

HOWARD M. BARBER.

Witnesses:
A. R. STILLMAN,
G. BURDICK.